US012652067B2

(12) United States Patent
Beruwawela Pathiranage et al.

(10) Patent No.: US 12,652,067 B2
(45) Date of Patent: Jun. 9, 2026

(54) METHOD AND APPARATUS FOR LOAD IMPEDANCE-AWARE EFFECTIVE ISOTROPIC RADIATED POWER (EIRP) CALIBRATION IN FR2 PHASED ARRAY TRANSMITTERS

(71) Applicant: Samsung Electronics Co., Ltd., Gyeonggi-do (KR)

(72) Inventors: Paboda Viduneth Ariyarathna Beruwawela Pathiranage, San Diego, CA (US); Wan Jong Kim, Tustin, CA (US); Pranav Dayal, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 378 days.

(21) Appl. No.: 18/422,459

(22) Filed: Jan. 25, 2024

(65) Prior Publication Data

US 2025/0047313 A1      Feb. 6, 2025

Related U.S. Application Data

(60) Provisional application No. 63/517,025, filed on Aug. 1, 2023.

(51) Int. Cl.
H04B 1/04       (2006.01)
H04B 17/10      (2015.01)
(52) U.S. Cl.
CPC ......... H04B 1/0458 (2013.01); H04B 1/0483 (2013.01); H04B 17/103 (2015.01)

(58) Field of Classification Search
CPC .. H04B 1/0458; H04B 1/0483; H04B 17/103; H04B 17/102; H04B 17/13; H04B 17/22; H04B 17/3912; H04B 17/12; H04B 1/04; H04B 17/15; H04B 2001/0416
See application file for complete search history.

(56) References Cited

U.S. PATENT DOCUMENTS

| | | | |
|---|---|---|---|
| 9,397,733 | B2 | 7/2016 | Paulraj |
| 10,211,530 | B2 | 2/2019 | Dang et al. |
| 11,038,546 | B2 | 6/2021 | Choi et al. |

(Continued)

OTHER PUBLICATIONS

Bhagavatula, Venumadhav et al., "A 5G FR2 Power-Amplifier With an Integrated Power-Detector for Closed-Loop EIRP Control" IEEE Journal of Solid-State Circuits, vol. 57, No. 5, pp. 1257-1266.

(Continued)

*Primary Examiner* — Fayyaz Alam
(74) *Attorney, Agent, or Firm* — The Farrell Law Firm, P.C.

(57)            ABSTRACT
A method and an apparatus are provided in which a first signal is received at a bi-directional coupler of an antenna path. A first power, delivered to an antenna of the antenna path, is measured based on a second signal corresponding to a forward signal provided from the bi-directional coupler to the antenna and a third signal corresponding to a reverse signal reflected back to the bi-directional coupler from the antenna. A power correction value is determined based on a ratio of the second signal to the third signal and a one-to-one relationship of the ratio to a load reflection coefficient of the antenna. A second power delivered to the antenna is determined based on the first power and the power correction value.

20 Claims, 6 Drawing Sheets

102

110

104          106          108

(56) References Cited

U.S. PATENT DOCUMENTS

| | | | |
|---|---|---|---|
| 2021/0359771 A1* | 11/2021 | Pyo | H04B 17/13 |
| 2022/0030525 A1 | 1/2022 | Chincholl et al. | |
| 2022/0149879 A1* | 5/2022 | Iversen | H04B 1/04 |
| 2023/0163866 A1 | 5/2023 | Choi et al. | |
| 2024/0004414 A1* | 1/2024 | Lee | G05F 1/70 |

OTHER PUBLICATIONS

Kuo, Chechun et al., "A 5G FR2 (n257/n258/n261) Transmitter Front-End with a Temperature-Invariant Integrated Power Detector for Closed-Loop EIRP Control" 2021 IEEE Radio Frequency Integrated Circuits Symposium (RFIC), pp. 175-178.
Li, Zheng et al., "A 39-GHz CMOS Bidirectional Doherty Phased-Array Beamformer Using Shared-LUT DPD With Inter-Element Mismatch Compensation Technique for 5G Base Station" IEEE Journal of Solid-State Circuits, vol. 58, No. 4, Apr. 2023, pp. 901-914.

* cited by examiner

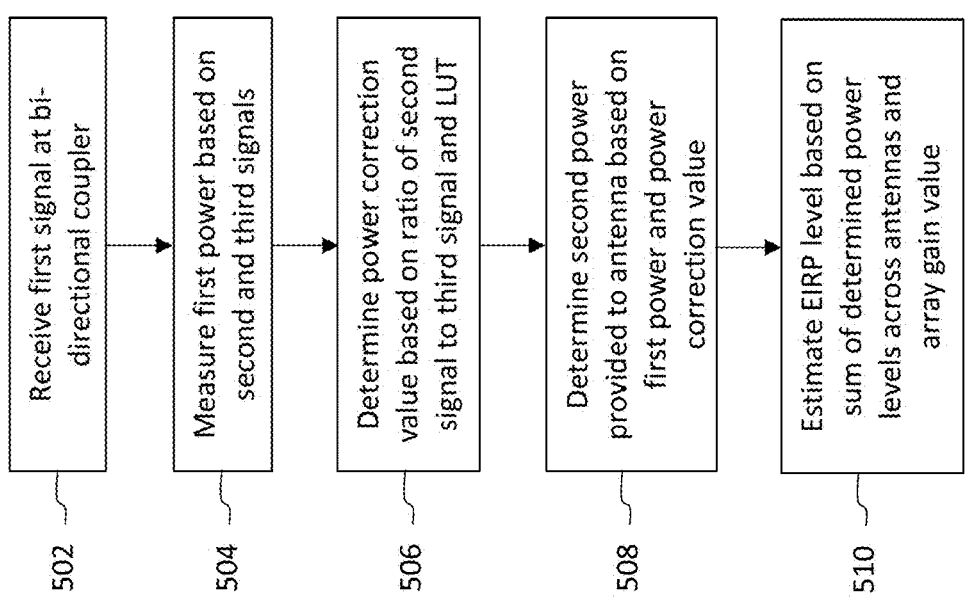

502 — Receive first signal at bi-directional coupler

504 — Measure first power based on second and third signals

506 — Determine power correction value based on ratio of second signal to third signal and LUT 508 — Determine second power provided to antenna based on first power and power correction value 510 — Estimate EIRP level based on sum of determined power levels across antennas and array gain value

FIG. 5

METHOD AND APPARATUS FOR LOAD IMPEDANCE-AWARE EFFECTIVE ISOTROPIC RADIATED POWER (EIRP) CALIBRATION IN FR2 PHASED ARRAY TRANSMITTERS

CROSS-REFERENCE TO RELATED APPLICATION

This application claims the priority benefit under 35 U.S.C. § 119 (c) of U.S. Provisional Application No. 63/517,025, filed on Aug. 1, 2023, the disclosure of which is incorporated by reference in its entirety as if fully set forth herein.

TECHNICAL FIELD

The disclosure generally relates to user equipment (UE) power maintenance. More particularly, the subject matter disclosed herein relates to improvements to methods for calibrating effective isotropic radiated power (EIRP) levels of a UE based on antenna loading.

SUMMARY

Guaranteeing a required level of radiated power with a low error margin is critical for UE operation. Additionally, maintaining a high-level of accuracy in a transmitted EIRP level from the UE has direct implications in wireless link performance, UE battery life, and regulatory aspects.

The calibration of EIRP levels using on-chip power detectors may pose a number of challenges due to chip-to-chip variation and antenna load impedance variation across antenna arrays. This may lead to costly and time-consuming calibration procedures at different stages (e.g., at a module-level or a UE-level).

To solve this problem, a set of calibration values may be established based on over-the-air (OTA) EIRP measurements and may be used to calibrate a power detector in each antenna path, which will compensate for the variations described above. These calibration values may be determined for individual and simultaneous operation in each antenna path.

One issue with the above approach is that OTA measurements are cumbersome and may require significant time and cost.

To overcome this issue, systems and methods are described herein for an internal calibration routine to estimate the load impedance, with the ability to optimize power detector calibration based on antenna loading.

This approach improves upon previous methods because the calibration routine is entirely self-contained and does not require equipment for OTA EIRP measurements, thereby reducing required time and cost.

In an embodiment, a method is provided in which a first signal may be received at a bi-directional coupler of an antenna path. A first power, delivered to an antenna of the antenna path, may be measured based on a second signal corresponding to a forward signal provided from the bi-directional coupler to the antenna and a third signal corresponding to a reverse signal reflected back to the bi-directional coupler from the antenna. A power correction value may be determined based on a ratio of the second signal to the third signal and a one-to-one relationship of the ratio with a load reflection coefficient of the antenna. A second power delivered to the antenna may be determined based on the first power and the power correction value.

In an embodiment, a method is provided in which, for each of a plurality of emulated reflection coefficients at a bi-directional coupler of an antenna path, a first signal corresponding to a first forward signal provided from the bi-directional coupler to an antenna of the antenna path, and a second signal corresponding to a first reverse signal reflected back to the bi-directional coupler from the antenna, may be determined. An input signal to the bidirectional coupler may be maintained for each of the plurality of emulated reflection coefficients. For each of the plurality of emulated reflection coefficients, a first power may be measured based on the first signal and the second signal. For each of the plurality of emulated reflection coefficients, a second power delivered to the antenna may be determined based on a respective reflection coefficient, and a respective power correction value may be determined based on the first power and the second power. A look-up table may be generated correlating the respective reflection coefficient, a ratio of the first signal to the second signal, and the respective power correction value, for each of the plurality of emulated reflection coefficients.

In an embodiment, a UE is provided that includes a phased array with each antenna path comprising an antenna and a bi-directional coupler. The UE also includes a processor and a non-transitory computer readable storage medium storing instructions. When executed the instructions may cause the processor to, for each antenna path, receive a first signal at the bi-directional coupler, measure a first power, delivered to the antenna, based on a second signal corresponding to a forward signal provided from the bi-directional coupler to the antenna and a third signal corresponding to a reverse signal reflected back to the bi-directional coupler from the antenna, determine a power correction value based on a ratio of the second signal to the third signal and a one-to-one relationship of the ratio with a load reflection coefficient of the antenna, and determine a second power delivered to the antenna based on the first power and the power correction value. Determined powers from the antenna paths may be summed, and an EIRP for the phased array may be determined based on the summed powers and an antenna gain for the phased array.

BRIEF DESCRIPTION OF THE DRAWING

In the following section, the aspects of the subject matter disclosed herein will be described with reference to exemplary embodiments illustrated in the figures, in which:

FIG. 5 is a flowchart illustrating method for determining EIRP for a phased array based on a pre-generated LUT, according to an embodiment.

DETAILED DESCRIPTION

Figure 1:
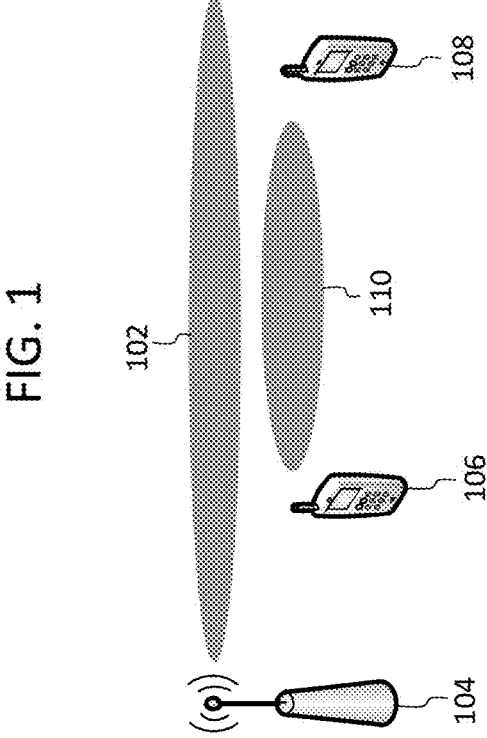
FIG. 1 is a diagram illustrating a communication system, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and case of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

FIG. 1 is a diagram illustrating a communication system, according to an embodiment. In the architecture illustrated in FIG. 1, a control path 102 may enable the transmission of control information through a network established between a base station or a gNode B (gNB) 104, a first UE 106, and a second UE 108. A data path 110 may enable the transmission of data (and some control information) on a sidelink between the first UE 106 and the second UE 108. The control path 102 and the data path 110 may be on the same frequency or may be on different frequencies.

Figure 2:
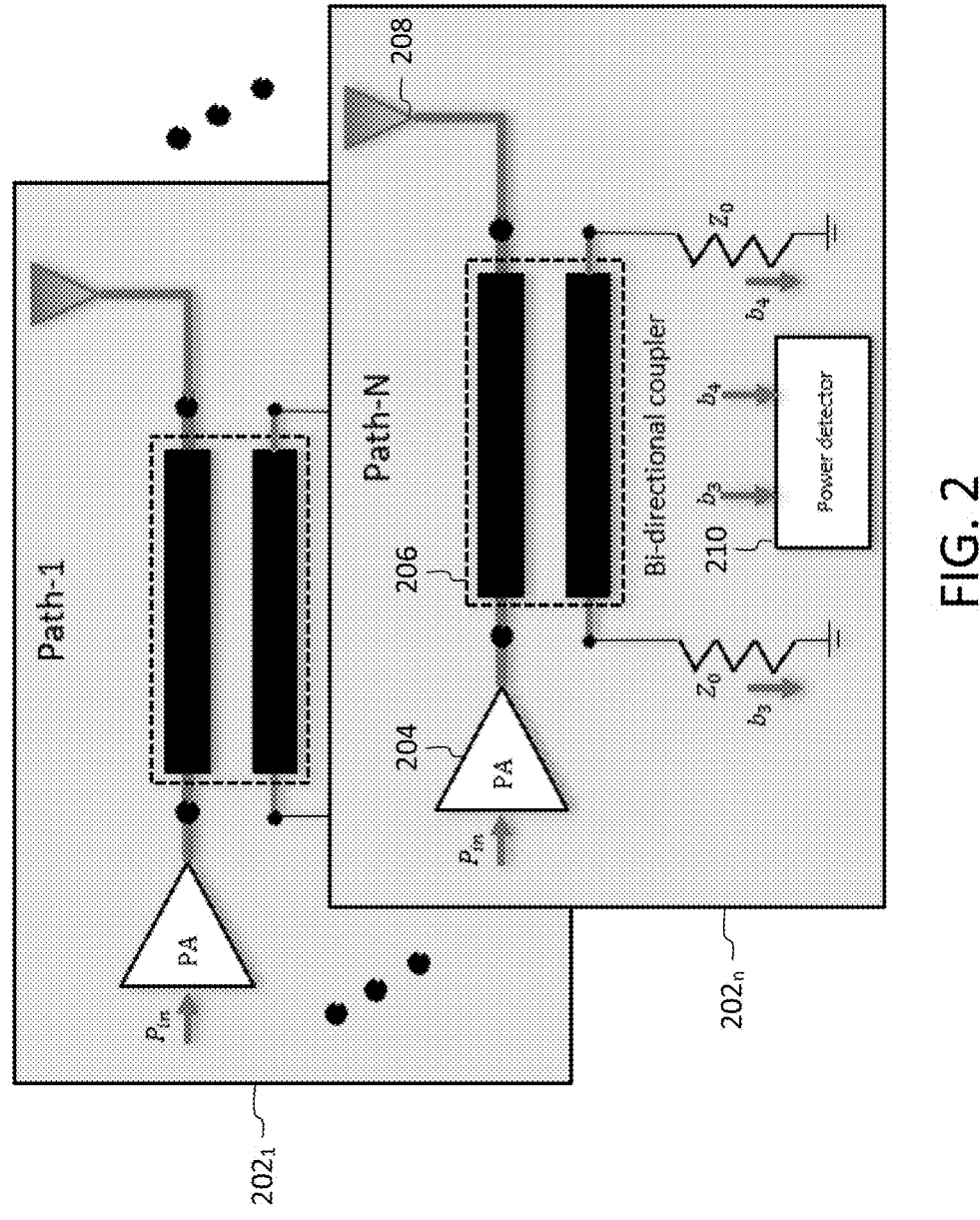
FIG. 2 is a diagram illustrating a transmit-mode phased array with a bi-directional coupler incorporated after a PA in each antenna path for transmission power monitoring, according to an embodiment.

FIG. 2 is a diagram illustrating a transmit-mode phased array with a bi-directional coupler incorporated after a PA in each antenna path for transmission power monitoring, according to an embodiment. A transmitter in frequency range-2 (FR2) may involve the use of phased arrays having multiple power amplifiers (PAs) and antennas. Accordingly, multiple antenna paths (e.g., $202_1$ and $202_n$) may be provided in the transceiver. In each antenna path, an input signal with power $P_{in}$ may be provided to a PA 204, which may provide amplified power to a bi-directional coupler 206, and subsequently, a respective antenna 208. The bi-directional coupler 206 may be used as a sensing device for the purpose of power control. An on-chip power detector 210 may detect the power delivered to the antenna 208 using outputs $b_3$ and $b_4$ from the bi-directional power coupler 206. The on-chip power detector 210 may require calibration to associate the reading to the actual transmitted power, and the detected readings from the power detectors in each antenna path may be combined to estimate total transmitted EIRP level.

According to an embodiment, a methodology is provided for calibrating EIRP of FR2 transmit phased arrays. Such a methodology may be agnostic to load-impedance and any changes that may occur due to different materials being in the close proximity to the antenna (e.g., due to the UE housing). EIRP calibration may be adjusted to reduce estimation inaccuracies.

An internal calibration routine is provided that may be used at a UE-level or a module-level to estimate antenna load and thereby, calibrate the on-chip power detectors. For example, a method for EIRP calibration may be based on LUTs that are generated based on reference load-pull (LP) measurements, without requiring any OTA EIRP measurements, making it a cost and time effective solution for calibration in mass production lines.

Figure 3:
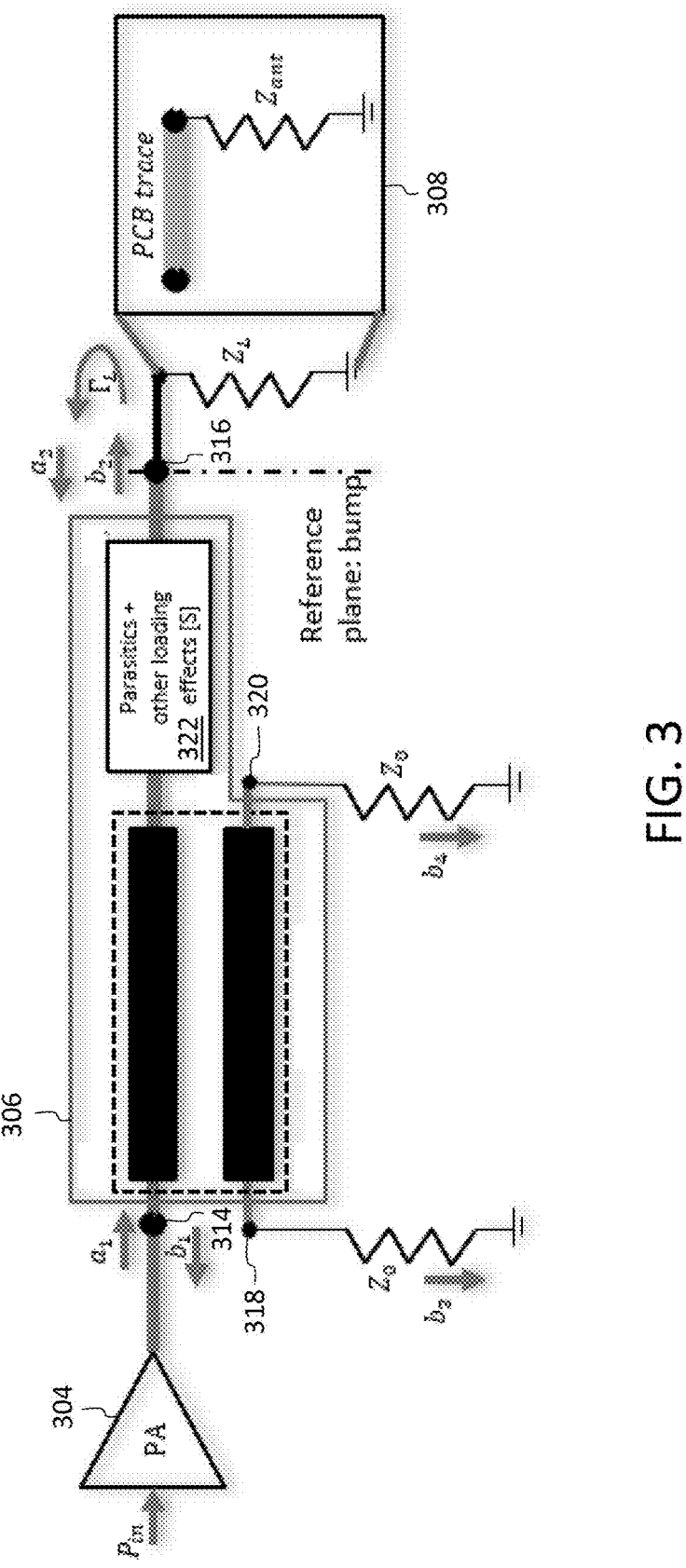
FIG. 3 is a diagram illustrating a circuit-level representation of a transmit path with a bi-directional coupler and a specific antenna loading, according to an embodiment.

FIG. 3 is a diagram illustrating a circuit-level representation of a transmit path with a bi-directional coupler and a specific antenna loading, according to an embodiment.

Specifically, FIG. 3 illustrates a transmit path hardware design in which an input power $P_{in}$ may be received at a PA 304, and a bi-directional coupler 306 may aid in sensing power provided to an antenna 308 and power reflected back (e.g., load reflection coefficient $\Gamma_L$) due to any impedance mismatch of antenna loading $Z_L$. The bi-directional coupler 306 (and the related non-idealities) may be represented by a four-port network including a first port 314, a second port 316, a third port 318, and a fourth port 320. Each port has a respective input $a_i$ and output $b_i$ (e.g., $a_1$, $b_1$, $a_2$, $b_2$, $b_3$, $b_4$), and the input at the third port 318 and the fourth port 320 ($a_3$ and $b_4$) may be assumed to be zero. The bi-directional coupler 306 may include non-idealities 322, such as parasitic and other loading effects, which may be represented by S parameters and corresponding ports (e.g., $S_{21}$, $S_{22}$, $S_{31}$, $S_{32}$, $S_{41}$, $S_{42}$).

The power delivered to the load may be determined using $b_3$ and $b_4$ signals output from the third port 318 and the fourth port 320 of the bi-directional coupler 306. The corresponding power-levels of the $b_3$ and $b_4$ signals may be sampled and read as a number between 0 and $2^P-1$, where P is the number of bits in an analog-to-digital converter (ADC) used in the power detectors. These ADC read-back (RB) levels may be associated with an actual power being radiated using a proportionate constant, which may be referred to as the calibration of an antenna path herein. The power detector RB values may not always be linear and may include non-linearity from finite coupler directivity, parasitic effects, and/or different loading effects.

The antenna 308, which is connected to the second port 316 of the bi-directional coupler 306 (e.g., a radio frequency (RF) port), may have a frequency dependent return loss and a gain profile that may complicate the calibration process. In 5th-generation (5G) FR2 operation, multiple non-identical antenna paths may be involved in the phased array beamformer, resulting in a complicated calibration that fuses each power detector RB value to predict an actual radiated EIRP level.

Referring back to FIG. 3, the signals $b_3$ and $b_4$ may be represented as shown in Equations (1) and (2) in terms of a first input signal $a_1$ received at the first port 314 of the bi-directional coupler 306.

$$b_3 = a_1\left(S_{31} + \frac{S_{32}S_{21}\Gamma_L}{1 - S_{22}\Gamma_L}\right) \tag{1}$$

-continued $$b_4 = a_1\left(S_{41} + \frac{S_{42}S_{21}\Gamma_L}{1 - S_{22}\Gamma_L}\right) \tag{2}$$

Given that the coupler directivity is adequate, the quantity $|b_3|^2-|b_4|^2$ may be used to represent the power delivered to the load, which may be expressed as shown in Equation (3) below.

$$|b_3|^2 - |b_4|^2 = \frac{|a_1|^2}{|1 - S_{22}\Gamma_L|^2}\left(|S_{31} - \Gamma_L(S_{31}S_{22} + S_{21}S_{32})|^2 - |S_{41} - \Gamma_L(S_{41}S_{22} + S_{21}S_{42})|^2\right) \tag{3}$$

As described above, the power detectors that sense the $|b_3|^2-|b_4|^2$ analog signal value may employ an ADC to read the detector reading, and may produce an integer-level as the RB, which may be denoted as $K(|b_3|^2-|b_4|^2)$, where K is a proportionate constant. The power delivered to the load $P_d$ may be expressed as shown in Equation (4), and thus, the power calibration value $P_{corr}$, which is the ratio of $P_d$ to $K(|b_3|^2-|b_4|^2)$, may take the form shown in Equation (5).

$$P_d = |b_2|^2\left(1 - |\Gamma_L|^2\right) = |a_1|^2\frac{|S_{21}|^2\left(1 - |\Gamma_L|^2\right)}{|1 - S_{22}\Gamma_L|^2} \tag{4}$$

$$P_{corr} = \frac{P_d}{K\left(|b_3|^2 - |b_4|^2\right)} = \tag{5}$$

$$\frac{1}{K} \cdot \frac{|S_{21}|^2\left(1 - |\Gamma_L|^2\right)}{|S_{31} - \Gamma_L(S_{31}S_{22} - S_{21}S_{32})|^2 - |S_{41} - \Gamma_L(S_{41}S_{22} - S_{21}S_{42})|^2}$$

As shown in Equation (5), the power calibration value $P_{corr}$ may have a dependence on the load reflection coefficient $\Gamma_L$, which is defined by a load impedance $Z_L$ and an output impedance of an RF integrated circuit (RFIC) port seen by the load.

In a phased array, due to the array geometry and mutual coupling, the effective impedance seen by each RFIC output port may be different in each antenna path, which may make the calibration coefficients differ for each antenna path. In order to estimate the load impedance and choose a load dependent calibration coefficient for each antenna path, a mapping from the reflection coefficient $\Gamma_L$ to the $b_3/b_4$ complex-valued gain is shown in Equation (6) below.

$$\beta = \frac{b_3}{b_4} = \frac{S_{31} - \Gamma_L(S_{31}S_{22} - S_{21}S_{32})}{S_{41} - \Gamma_L(S_{41}S_{22} - S_{21}S_{42})} \tag{6}$$

Since antenna arrays are generally used for FR2 cellular operations, the transmitted EIRP level depends on a total antenna array gain $G_{array}$ and a total power delivered to the array $P_{d,array}$, where a resultant EIRP level $P_{EIRP}$ may be calculated as shown in Equation (7).

$$P_{EIRP} = G_{array} \cdot P_{d,array} \tag{7}$$

The value $P_{d,array}$ may be calculated based on the power delivered to each antenna port as shown in Equation (8), where $P_{d,i}$ is the power delivered to each $i^{th}$ antenna, where $i \in [1, N]$, and N denotes the number of total antenna elements in the array.

$$P_{d,array} = \sum_{i=1}^{N} P_{d,i} \qquad (8)$$

$P_{d,i}$ may be calculated as shown in Equation (9), based on the power detector reading $P_{det,i}$ at each $i^{th}$ antenna path and $P_{corr,i}$, which is the calibration factor for the path. Accordingly, an estimated EIRP level $P_{EIRP,est}$ may be derived as shown in Equation (10) below.

$$P_{d,i} = P_{corr,i} \cdot P_{det,i} \qquad (9)$$

$$P_{EIRP,est} = G_{array} \cdot \sum_{i=1}^{N} P_{corr,i} \cdot P_{det,i} \qquad (10)$$

As shown in Equation (6), there is a one-to-one relationship between $b_3/b_4$ and $\Gamma_L$. This allows for the estimation of the actual antenna impedance or the load reflection coefficient $\Gamma_L$ using an internal measurement, and allows for the use of a load impedance-aware power calibration coefficient in the UE based on a pre-set reference mapping. For the reference mapping, an LP measurement (LPM) setup may be used to generate a table with adequately sampled Smith-chart load points to create a mapping from the reflection coefficient $\Gamma_L$ at the load, e.g., as shown in Table 1. Assuming a variation among inter-antenna path output impedance is small, the table may be created based on data of one port. Power delivered to the emulated load in the LP tuner ($P_d$) and the corresponding power detector reading ($P_{det}$) may be used to compute the $P_{corr}$ in the 4th column of Table 1. Such an LUT may be used to find the load-dependent $P_{corr}$ based on the $b_3/b_4$ complex-valued gain measured/calculated at each antenna path of a phased array module.

TABLE 1

| Index | $\Gamma_L$ (sampled Smith chart) | $\beta = \dfrac{b_3}{b_4}$ (via FBRx) | $P_{corr}$(computed via LPM) |
|---|---|---|---|
| $k \in [1, M]$ | $|\Gamma_{L,K}|e^{j\Theta_k}$ | $\beta_k$ | $\alpha_k$ |

M: the number of total LP points in the LUT

The $b_3/b_4$ ratio in Table 1 may be obtained via transmitting a known baseband signal x[n] (where n is a sample index) and capturing and post-processing the $b_3[n]$ and $b_4[n]$ baseband signal samples (at the same sample rate of x[n]). Each captured signal $b_3[n]$ and $b_4[n]$ may be individually cross-correlated with the transmitted signal samples for time aligning as shown in Equation (11) to obtain $c_p[m]$, where p=3 or 4 in $b_p[n]$.

8

$$c_p[m] = \sum_n (x^*[n]b_p[n+m]) \text{ where } m, n \in Z \& p \in [3, 4] \qquad (11)$$

If the individual cross-correlation peak points for $b_3[n]$ and $b_4[n]$ occur at $m=m_3$ and $m=m_4$, respectively, in Equation (11), then the complex-valued gain ratio, referred to as $b_3/b_4$, may be calculated as shown in Equation (12).

$$\frac{b_3}{b_4} = \frac{c_3[m = m_3]}{c_4[m = m_4]} \qquad (12)$$

During calibration, each $i^{th}$ path $b_3/b_4$ ratio $\beta_i$ may be measured and as shown in the algorithm in Table 2. The measured $\beta_i$ values may be used to fetch a corresponding $P_{corr,i}$ from a pre-stored LUT (e.g., Table 1). The obtained $P_{corr,i}$ values may be used to estimate the EIRP value $P_{eirp,est}$ as show in Equation (10) above, where $G_{array}$ may be based on measurements or simulations for a particular frequency of operation.

TABLE 2

Figure 4:
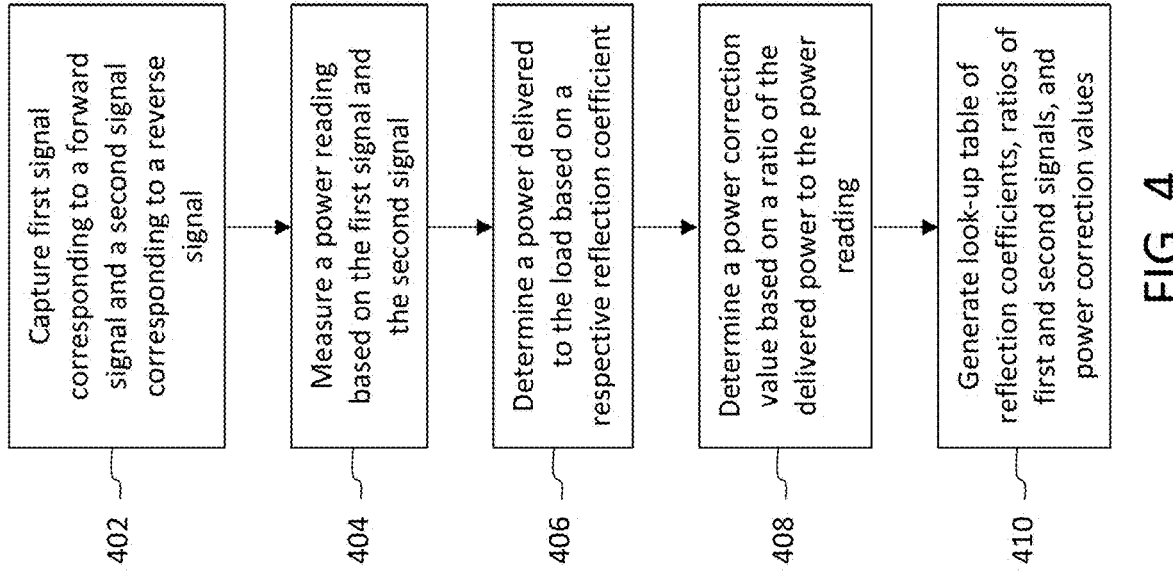
FIG. 4 is a flowchart illustrating a method for generating a look-up table (LUT) for EIRP calibration for a phased array, according to an embodiment.

Input: $\beta_1, \beta_2, \ldots, \beta_N$
LUT: M × 4 LUT as defined in Table 1 where columns are, "Row index", "$\Gamma_L$", "$\beta$" and "$P_{corr}$". M is the total number rows.
Output: $P_{corr} = [P_{corr,1}, P_{corr,2}, \ldots, P_{corr,N}]$
for each antenna index n from 1 to N:
  $P_{corr}[n] = \text{LUT} [k, 4]$ where k is the row index that minimizes $|\beta_k - \beta_n| \forall k \in [1, M]$ in the LUT
Return $P_{corr}$ FIG. 4 is a flowchart illustrating a method for generating an LUT for EIRP calibration for a phased array, according to an embodiment. At 402, for each of a plurality of emulated reflection coefficients at a bi-directional coupler of an antenna path, a first signal may be captured that corresponds to a forward signal provided from the bi-directional coupler to an antenna of the antenna path, as described above with respect to Equation (1), and a second signal may be captured that corresponds to a reverse signal reflected back to the bi-directional coupler from the antenna, as described above with respect to Equation (2). An input signal to the bi-directional coupler remains the same for each of the plurality of emulated reflection coefficients. At 404, for each of the plurality of emulated reflection coefficients, a power reading may be measured by an on-chip power detector based on the first signal and the second signal, as described above with respect to Equation (3). At 406, for each of the emulated reflection coefficients, a power delivered to the load may be determined based on a respective reflection coefficient, as described above with respect to Equation (4). At 408, for each of the plurality of emulated reflection coefficients, a power correction value may be determined based on a ratio of the power determined at 406 to the power determined at 404, as described above with respect to Equation (5). At 410, an LUT may be generated mapping the respective reflection coefficient, a ratio of the first signal to the second signal, and the power correction value, for each of the plurality of emulated reflection coefficients.

FIG. 5 is a flowchart illustrating a method for determining EIRP for a phased array based on a pre-generated LUT, according to an embodiment. At 502, a first signal may be received at a bi-directional coupler of an antenna path connected to actual antenna loading. The first signal may be provided to the bi-directional coupler from a power amplifier in the antenna path.

At 504, a first power delivered to an antenna of the antenna path may be measured using a power detector based on a second signal corresponding to a forward signal provided from the bi-directional coupler to the antenna and a third signal corresponding to a reverse signal reflected back to the bi-directional coupler from the antenna. The bi-directional coupler may include a first port that receives the first signal, a second port that outputs the second signal, a third port that outputs the third signal, and a fourth port that outputs the forward signal and receives the reverse signal. The second signal and the third signal may be based on the first signal and corresponding loading effects for one or more of the first or second ports.

At 506, a power correction value may be determined based on a ratio of the second signal to the third signal and an LUT. The ratio may be a complex-valued gain measurement ratio. The LUT correlates second and third signal ratios to power correction values based on the one-to-one relationship of the ratios to corresponding load reflection coefficients, as described above with respect to FIG. 4. Specifically, a power correction value may be selected from an LUT entry having a ratio that is closest to the measured ratio of the second signal to the third signal.

At 508, a second power delivered to the antenna may be determined based on the first power and the power correction value. The antenna path may be part of a phased array having a plurality of antenna paths. The second power may be summed with one or more powers determined as provided to antennas in remaining antenna paths of the phased array. An EIRP for the phased array may be determined based on the summed powers and an antenna gain of the phased array, at 510.

Figure 6:
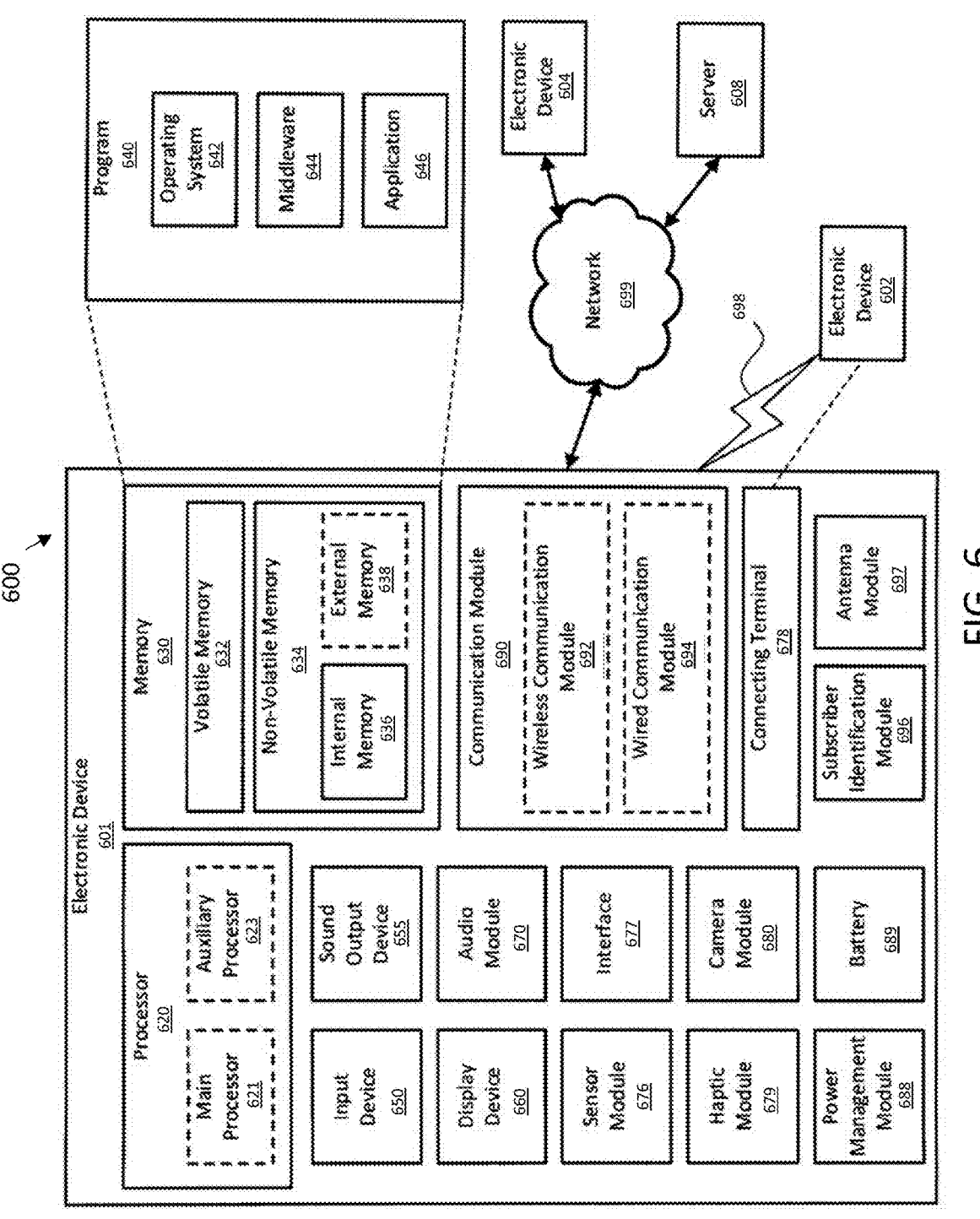
FIG. 6 is a block diagram of an electronic device in a network environment, according to an embodiment.

FIG. 6 is a block diagram of an electronic device in a network environment 600, according to an embodiment.

Referring to FIG. 6, an electronic device 601 in a network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) card 696, or an antenna module 697. In one embodiment, at least one (e.g., the display device 660 or the camera module 680) of the components may be omitted from the electronic device 601, or one or more other components may be added to the electronic device 601. Some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute software (e.g., a program 640) to control at least one other component (e.g., a hardware or a software component) of the electronic device 601 coupled with the processor 620 and may perform various data processing or computations.

As at least part of the data processing or computations, the processor 620 may load a command or data received from another component (e.g., the sensor module 676 or the communication module 690) in volatile memory 632, process the command or the data stored in the volatile memory 632, and store resulting data in non-volatile memory 634. The processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). The auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634. Non-volatile memory 634 may include internal memory 636 and/or external memory 638.

The program 640 may be stored in the memory 630 as software, and may include, for example, an operating system (OS) 642, middleware 644, or an application 646.

The input device 650 may receive a command or data to be used by another component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. The display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. The audio module 670 may obtain the sound via the input device 650 or output the sound via the sound output device 655 or a headphone of an external electronic device 602 directly (e.g., wired) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wired) or wirelessly. The interface 677 may include, for example, a high-definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. The connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. The haptic module 679 may include, for example, a motor, a piezoelectric element, or an electrical stimulator.

The camera module 680 may capture a still image or moving images. The camera module 680 may include one or more lenses, image sensors, image signal processors, or flashes. The power management module 688 may manage power supplied to the electronic device 601. The power management module 688 may be implemented as at least part of, for example, a power management integrated circuit (PMIC).

The battery 689 may supply power to at least one component of the electronic device 601. The battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. The communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as BLUETOOTH™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. The antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

The antenna module 697 may include a phased array having antenna paths as shown and described with respect to FIG. 2, and each antenna path may include a PA, a bi-directional coupler, a power detector, and an antenna, as shown and described with respect to FIG. 3.

Commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method comprising:
receiving a first signal at a bi-directional coupler of an antenna path;
measuring a first power delivered to an antenna of the antenna path, based on a second signal corresponding to a forward signal provided from the bi-directional coupler to the antenna and a third signal corresponding to a reverse signal reflected back to the bi-directional coupler from the antenna;
determining a power correction value based on a ratio of the second signal to the third signal and a one-to-one relationship of the ratio with a load reflection coefficient of the antenna; and
determining a second power delivered to the antenna based on the first power and the power correction value.

2. The method of claim 1, wherein:
the bi-directional coupler comprises a first port that receives the first signal, a second port that outputs the second signal, a third port that outputs the third signal, and a fourth port that outputs the forward signal and receives the reverse signal; and
the first power is measured by an on-chip power detector.

3. The method of claim 2, wherein the second signal and the third signal are based on the first signal and corresponding loading effects for one or more of the first or second ports.

4. The method of claim 1, wherein the first signal is received at the bi-directional coupler from a power amplifier in the antenna path.

5. The method of claim 1, wherein determining the power correction value is based on a look-up table (LUT) correlating ratios to power correction values based on the one-to-one relationship, and the power correction value is selected from an LUT entry having a ratio that is closest to the ratio of the second signal to the third signal.

6. The method of claim 1, wherein the ratio comprises a complex-valued gain measurement ratio.

7. The method of claim 1, wherein the antenna path is part of a phased array comprising a plurality of antenna paths, and further comprising:
summing the second power with one or more powers determined as delivered to antennas in remaining antenna paths of the phased array; and
determining an effective isotropic radiation power (EIRP) for the phased array based on the summed powers and an antenna gain of the phased array.

8. A method comprising:
determining, for each of a plurality of emulated reflection coefficients at a bi-directional coupler of an antenna path, a first signal corresponding to a first forward signal provided from the bi-directional coupler to an antenna of the antenna path, and a second signal corresponding to a first reverse signal reflected back to the bi-directional coupler from the antenna, wherein an input signal is maintained for each of the plurality of emulated reflection coefficients;
measuring, for each of the plurality of emulated reflection coefficients, a first power based on the first signal and the second signal;
determining, for each of the plurality of emulated reflection coefficients, a second power delivered to the antenna based on a respective reflection coefficient;

determining, for each of the plurality of emulated reflection coefficients, a respective power correction value based on the first power and the second power; and generating a look-up table correlating the respective reflection coefficient, a first ratio of the first signal to the second signal, and the respective power correction value, for each of the plurality of emulated reflection coefficients.

9. The method of claim 8, further comprising:

applying a third signal to the bi-directional coupler;

measuring a third power delivered to the antenna, based on a fourth signal corresponding to a second forward signal provided from the bi-directional coupler to the antenna, and a fifth signal corresponding to a second reverse signal reflected back to the bi-directional coupler from the antenna;

determining a power correction value based on the look-up table and a second ratio of the fourth signal to the fifth signal; and determining a fourth power delivered to the antenna based on the third power and the power correction value.

10. The method of claim 9, wherein:

the bi-directional coupler comprises a first port that receives the input signal and the third signal, a second port that outputs the first signal and the fourth signal, a third port that outputs the second signal and the fifth signal, and a fourth port that outputs the first and second forward signals and receives the first and second reverse signals; and the first power and the third power are measured by an on-chip power detector.

11. The method of claim 10, wherein the fourth and fifth signals are based on the third signal and corresponding loading effects for one or more of the first or second ports.

12. The method of claim 9, wherein the third signal is received at the bi-directional coupler from a power amplifier in the antenna path.

13. The method of claim 9, wherein the second ratio comprises a complex-valued gain measurement ratio.

14. The method of claim 9, wherein the antenna path is part of a phased array comprising a plurality of antenna paths, and further comprising:

summing the fourth power with one or more powers determined as delivered to antennas in remaining antenna paths of the phased array; and determining an effective isotropic radiation power (EIRP) for the phased array based on the summed powers and an antenna gain of the phased array.

15. A user equipment (UE) comprising:

a phased array with each antenna path comprising an antenna, a bi-directional coupler, and a power detector;

a processor; and a non-transitory computer readable storage medium storing instructions that, when executed, cause the processor to:

for each antenna path:

receive a first signal at the bi-directional coupler;

measure, at the power detector, a first power delivered to the antenna, based on a second signal corresponding to a forward signal provided from the bi-directional coupler to the antenna and a third signal corresponding to a reverse signal reflected back to the bi-directional coupler from the antenna;

determine a power correction value based on a ratio of the second signal to the third signal and a one-to-one relationship of the ratio with a load reflection coefficient of the antenna; and determine a second power delivered to the antenna based on the first power and the power correction value;

sum determined powers from each antenna path; and determine an effective isotropic radiation power (EIRP) for the phased array based on the summed powers and an antenna gain for the phased array.

16. The UE of claim 15, wherein the bi-directional coupler comprises a first port that receives the first signal, a second port that outputs the second signal, a third port that outputs the third signal, and a fourth port that outputs the forward signal and receives the reverse signal.

17. The UE of claim 16, wherein the second signal and the third signal are based on the first signal and corresponding loading effects for one or more of the first or second ports.

18. The UE of claim 15, wherein each antenna path further comprises a power amplifier that provides the first signal to the bi-directional coupler.

19. The UE of claim 15, wherein determining the power correction value is based on a look-up table (LUT) correlating ratios to power correction values based on the one-to-one relationship, and the power correction value is selected from an LUT entry having a ratio that is closest to the ratio of the second signal to the third signal.

20. The UE of claim 15, wherein the ratio comprises a complex-valued gain measurement ratio.

* * * * *